April 16, 1968 — A. M. MAROTH — 3,377,878
MECHANICAL DRIVE

Filed Oct. 18, 1966 — 3 Sheets-Sheet 1

INVENTOR.
Arthur M. Maroth
BY
AGENT

INVENTOR.
Arthur M. Maroth

April 16, 1968     A. M. MAROTH     3,377,878
MECHANICAL DRIVE
Filed Oct. 18, 1966     3 Sheets-Sheet 3
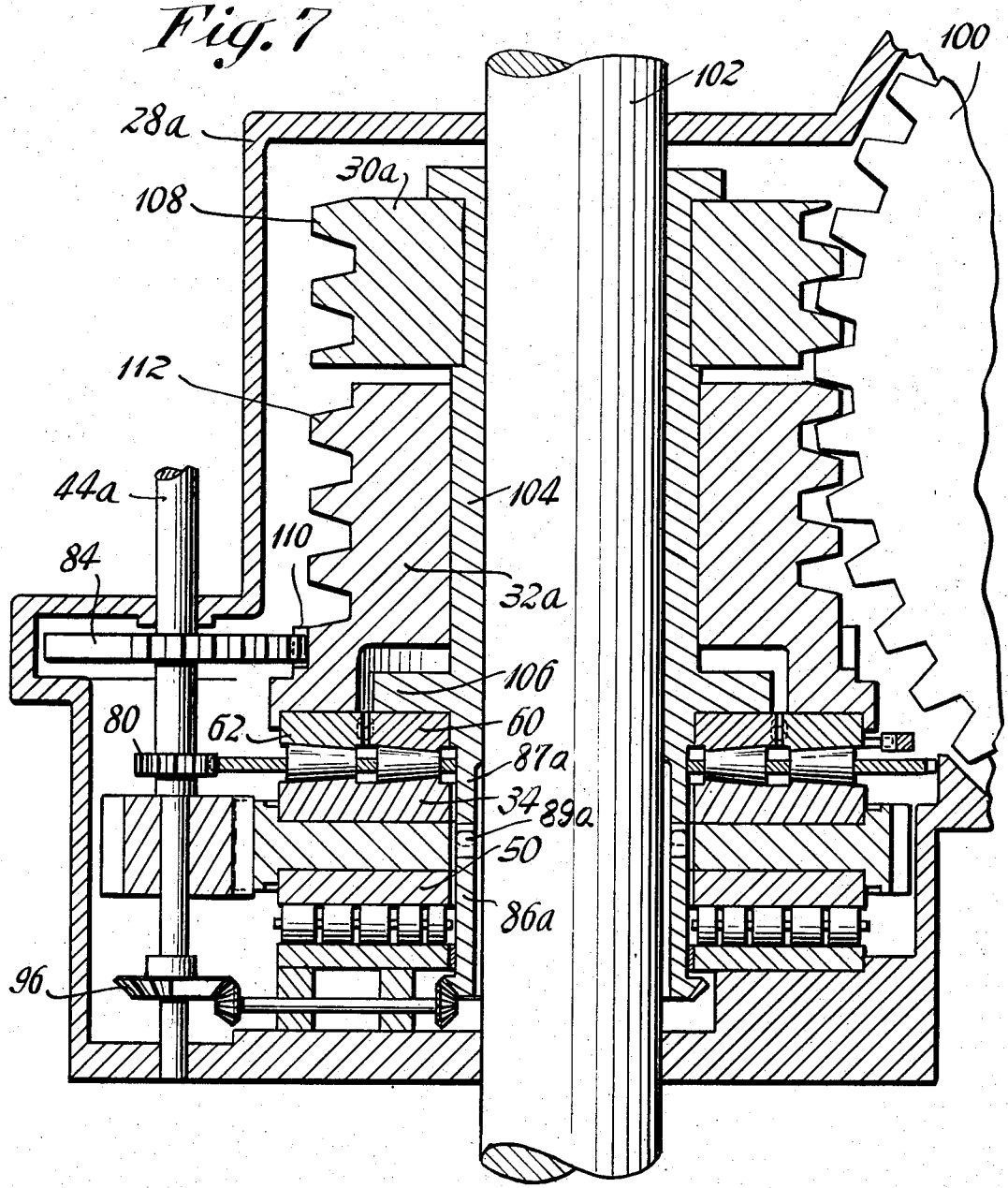
INVENTOR.
Arthur M. Maroth
BY
AGENT

United States Patent Office 3,377,878
Patented Apr. 16, 1968

3,377,878
MECHANICAL DRIVE
Arthur M. Maroth, % Maroth Engineering Co., Grumman Hill Road, Wilton, Conn. 06897
Filed Oct. 18, 1966, Ser. No. 587,584
17 Claims. (Cl. 74—424.8)

ABSTRACT OF THE DISCLOSURE

A mechanical transmission wherein the driven part is a toothed member such as a screw or gear, said member having a continuous advancing movement and being driven by two alternately powered turnable parts which are always fully meshed with the toothed member. When driving, each turnable part is moved only axially, by rollers and cams, and friction is reduced to a minimum. When not driving, each turnable part is made to turn in a retrograde manner (now permitted by its associated cam) so as to retract and secure a new driving position or "grip" relative to the toothed member. The axial driving and retrograde turning movements of the parts alternate, and least friction occurs for the axial movements, which is where the power is being transmitted.

---

This invention relates to mechanical transmissions, and more particularly to very powerful, low friction transmissions of the type which employ a cam action and effect a speed reduction in transmitting power between the input and output members.

The present invention concerns improvements in the mechanical transmission described and claimed in my patents, Nos. 2,836,985 dated June 3, 1958 and 2,928,289 dated March 15 1960, both entitled "Torque Converting Apparatus," and my Patent No. 3,266,333 dated Aug. 16, 1966 and entitled "Mechanical Transmission."

Objects of the invention are to provide an improved transmission of the kind identified, which retains all the advantages of my prior transmissions yet is very much smaller and more compact, which utilizes fewer parts, is simpler and less costly to manufacture, more rugged, durable and powerful, lighter in weight, characterized by a more direct action of the heavy-load carrying members and by shorter sections of said members; and to provide an improved transmission as above, which when utilizing an elongate, axially moving output member effects a concentration of the heavy-load stresses to areas which are more closely disposed to the axis of said member, thereby making possible lighter and smaller sections of the operating parts.

Other features and advantages will hereinafter appear.

In the drawings:

FIG. 7 is an axial sectional view through a transmission representing another embodiment of the invention, wherein rotary motion is converted to rotary motion with reduced friction and great mechanical advantage.

Figure 1:
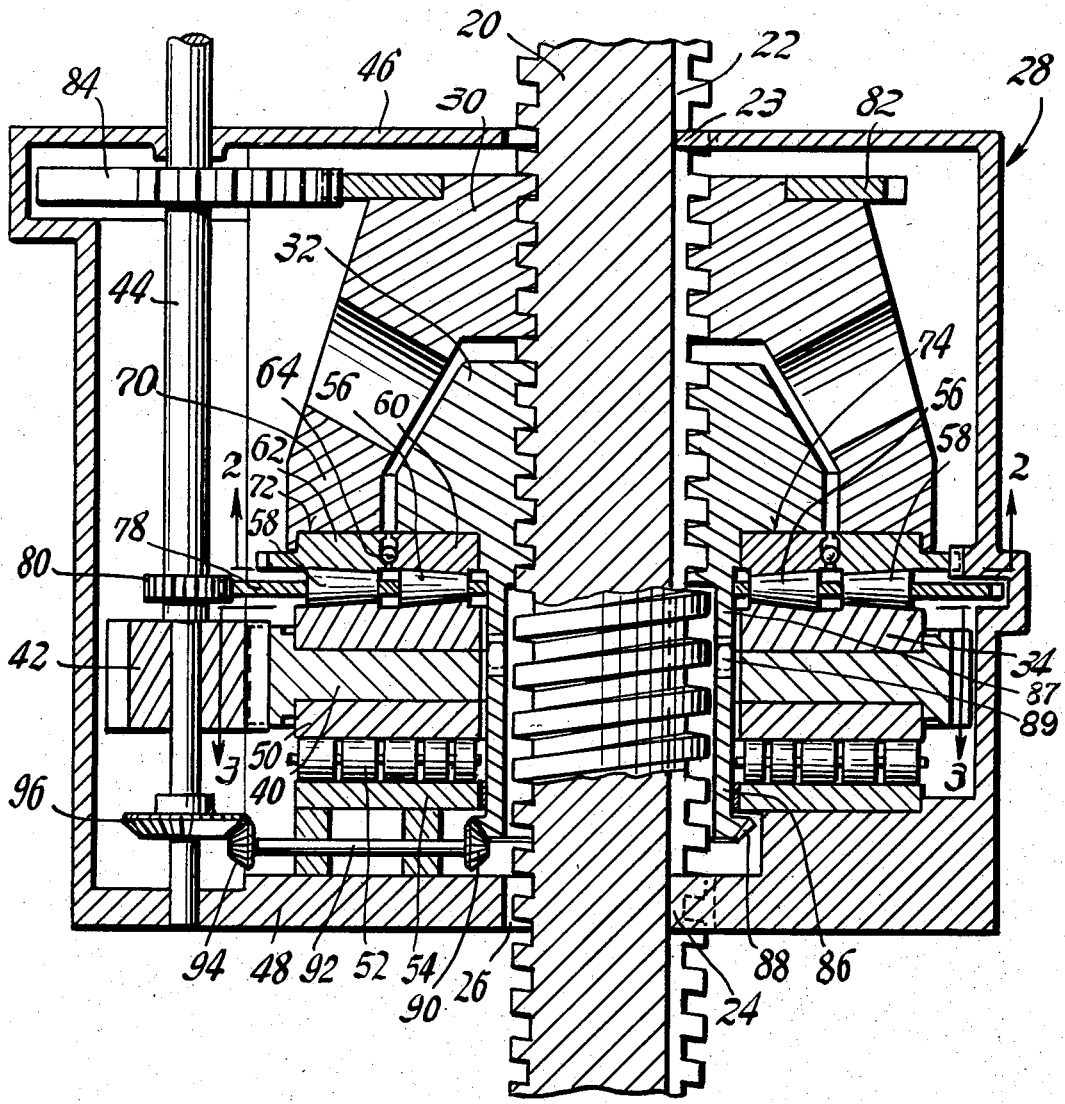
FIG. 1 is an axial section of an improved drive or transmission illustrating one embodiment of the invention, wherein rotary motion is converted to linear motion.
Figure 2:
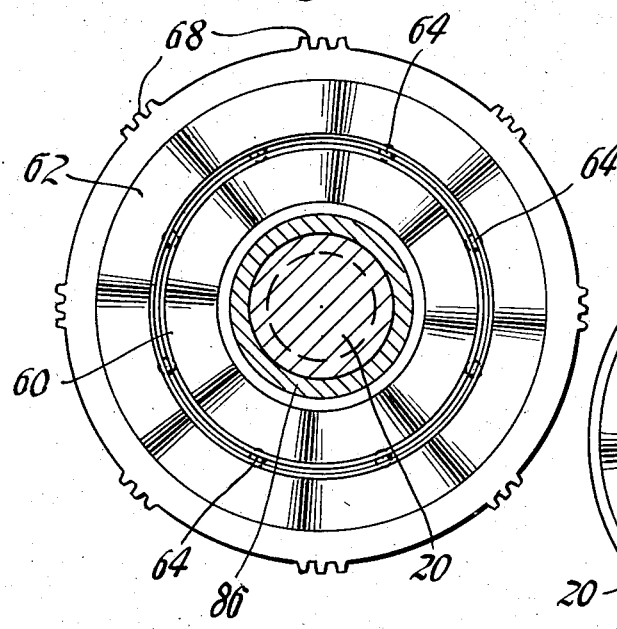
FIG. 2 is a transverse section taken on line 2—2 of FIG. 1.

As already set forth above, the present invention involves improvements in the mechanical transmissions described in detail and claimed in my Patents Nos. 2,836,-985, 2,928,289, and 3,266,333. The basic concepts illustrated and described in these three patents are also present in the mechanical transmission devices as provided in the present invention, and accordingly an understanding of the present improvements may also be readily had by referring to the drawings and specifications of my identified issued patents.

Considering first FIGS. 1–6, the mechanical transmission as illustrated therein comprises a toothed driven member 20 in the form of a long screw, said member representing the output of the transmission and having essentially a linear or axial movement without any turning whatsoever. To prevent its turning, the screw 20 has a keyway 22 which accommodates fixed keys 23 and 24 provided in a vertical bore 26 of a stationary supporting base and housing structure 28. In the appended claims the screw 20 is referred to as a "toothed driven member."

On the screw 20 there is a pair of threaded rotary drive members 30, 32 which in accordance with the invention are closely juxtaposed and disposed end to end, and which are individually turnable and axially movable, said drive members comprising nuts having internal helical threads which are engaged with the threads of the screw 20. By such engagement, axial lifting movement of the screw 20 is effected in response to upward axial movements of the drive members or nuts 30, 32, and such axial movements of the nuts alternate as will be hereinafter explained.

Figure 3:
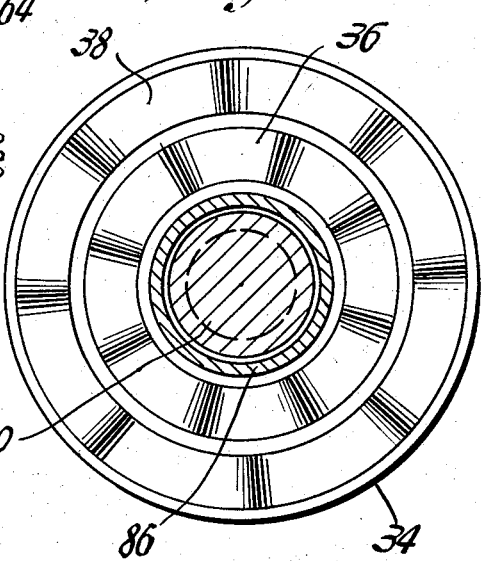
FIG. 3 is a transverse section taken on line 3—3 of FIG. 1.

Whenever one of the nuts 30, 32 is not lifting the screw 20, it experiences a reverse or downward, return axial movement by virtue of its being turned, this not requiring retrograde movement of the driven member or screw 20 due to such turning. The retrograde, return axial movements of the nuts 30, 32 always alternate and are intermittent, and such turning movements occur simultaneously with turning of a master or main rotary cam device 34 provided by the invention. As seen in FIG. 3, the rotary cam device 34 comprises concentrically disposed inner and outer cam tracks 36, 38 respectively, having contours along the lines of that shown in FIGS. 4, 5 and 6.

In accordance with the present invention the drive members 30, 32 are in immediately adjoining relationship and are preferably nested one within a recess or socket of the other, and the cam device 34 comprising the concentric inner and outer lifting cam portions 36, 38 is oriented in such a manner that said portions act alternately, to effect alternate axial or raising movements of the nuts 30, 32 as will be later explained in detail.

The compound-type rotary cam device 34 is in accordance with the invention carried by a large gear. The said gear is labelled 40, and has teeth which are engaged by a pinion 42 disposed on a drive shaft 44 which is the input of the transmission and which bears in the upper and lower walls 46, 48 respectively of the housing 28.

The gear 40 has an annular bearing race 50 which is supported by anti-friction roller elements 52 cooperable with a second annular bearing race 54, said parts comprising a thrust bearing assemblage. The race 54 is supported on the bottom wall 48 of the housing 28 as shown.

Resting on the rotary cam device 34 are inner and outer alternately-lifting sets of anti-friction rollers 56, 58 respectively, adapted to ride respectively on the cam faces 36, 38. Above and cooperable with the sets of rollers 56, 58 are, as provided by the invention, juxtaposed inner and outer, concentric rotary cams 60, 62 respectively, the said cams being keyed against relative turning, as by ball bearings 64 carried in suitable slots in the edge portions of the cams.

The outer cam 62 has sets of gear teeth 68 engaged with cooperable teeth provided on the inside of the stationary housing 28, to prevent rotary movement of the cams while permitting limited axial or raising and lowering movements thereof.

The rotary drive member or nut 30 is shown as being of somewhat hollow configuration, having a thick depending peripheral wall portion 70 provided at its bottom edge with a circular nest configuration 72 in which the outer cam 62 is slidably or turnably received. Likewise, the rotary driving member or nut 32 has a nesting configuration 74 in which the inner cam 60 is loosely, turnably received.

The various pairs of the sets of roller elements 56, 58 may each comprise axially aligned units disposed along radial lines or axes. That is, the two rollers 56, 58 seen in FIG. 1 can have a common axis, which axis follows an imaginary radial line emanating from the center of the drive screw 20. The adjoining pairs of rollers in the sets between the cams 34, 60 and 62 also are on individual common axes which are disposed along radial lines.

The rollers 56, 58 are under the control of a driven rotary cage 78 which has gear teeth around its external periphery, engaged with a pinion 80 carried by the shaft 48.

By the above construction, a driving force applied to the shaft 44 will cause continuous turning of the gear 40 and the rotary cam device 34, as well as causing continuous turning of the cage 78. Since the cage turns at a different rate from the cam device, the rollers 56, 58 will alternately ride up and down on the cam races 36, 38. This in turn will cause the rotary cams 60, 62 to be alternately raised and lowered, and the raising movement of any one cam will result in its associated rotary drive member or nut being raised, lifting the driven screw 20. During the lowering intervals of the cams 60, 62 when the associated nuts are not under load, they are rotated to effect a retrograde or downward movement along the screw 20, this being effected by an intermittent drive mechanism.

Referring to FIG. 1, the upper nut 30 has a gear 82 which is engaged by a segmented or intermittent drive gear 84 on the shaft 44. And, in accordance with the invention, the lower nut or drive member 32 is provided with a torque-transmitting device in the form of a two-part extensible and retractable sleeve 86, 87 having a spline connection 89 between the parts thereof, said sleeve extending downward inside both the cam device 34 and the bearing assemblage comprising the parts 50, 52 and 54, the lower end of the sleeve 86 having a bevel gear 88 engaged with a cooperable bevel gear 90 on a shaft 92 carried in suitable bearings in the bottom wall 48 of the housing 28. The shaft 92 has a second bevel gear 94 engaged with a segmental or intermittent drive bevel gear 96 carried on the shaft 44. With such organization, the continuous turning movement of the shaft 44 will result in intermittent retrograde turning movements of the drive members or nuts 30, 32, this being arranged to occur at those intervals when the nuts are not carrying any load or lifting the screw 20. In other words, the intermittent drive of the nuts 30, 32 is synchronized with the action of the cams 34, 60, 62 whereby a lifting action by one cam couple is accompanied by a turning movement of the nut associated with the other cam couple, and vice versa. The principle of the intermittent lifting and retrograde action of nuts on a screw is fully explained in detail in my patents above identified.

Figure 4:
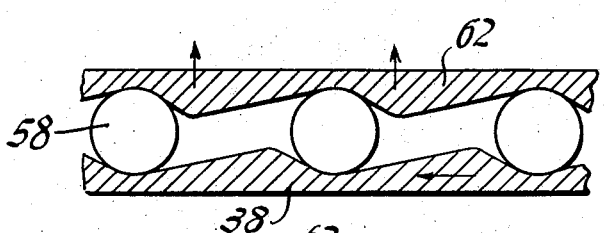
FIG. 4 is a schematic representation illustrating the action of two rotary cams of the transmission, said cams being shown in their most closely spaced positions.
Figure 5:
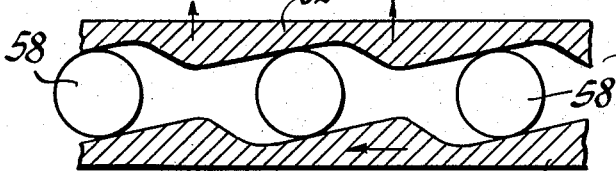
FIG. 5 is a view like that of FIG. 4 but showing the two rotary cams after a certain amount of axial separating movement has taken place.
Figure 6:
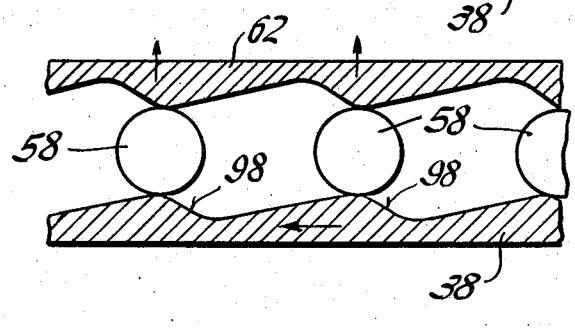
FIG. 6 is a view like that of FIGS. 4 and 5, showing the rotary cams in the positions where they are most widely separated.

Referring to FIGS. 4, 5 and 6 it will be seen that a lifting action is depicted as the lower cam element 38 is made to travel from right to left. Following the position in FIG. 6, the lifting action will be discontinued, and load will be removed from the upper cam 62 as the rollers 48 descend the short inclines marked 98. During such condition, the nut 30 which is associated with the cam 62 will have imparted to it a partial rotary movement, causing it to shift axally downward on the screw 20.

It will be understood that in place of segmented or partial gear wheels 84 and 96, other intermittent type drive devices may be employed. And, other substitutions and equivalents may be utilized as will occur to those skilled in the art. The rollers 56, 58 may be staggered and the cam faces 36, 38 may be in registration, for example.

Another embodiment of the invention is illustrated in FIG. 7, wherein there is effected a conversion of rotary movement to rotary movement, as distinguished from the rotary to linear movement of the embodiment of FIGS. 1–6. In FIG. 7, parts which are similar to those already described have been given like characters. Essentially, the linear-movement output screw 20 of FIG. 1 has been replaced by an output gear wheel 100 which is disposed externally of the cam-actuated rotary drive members, and a central supporting shaft 102 has been inserted in place of the screw 20, to provide a bearing for said drive members. The housing 28a in FIG. 7 has a slightly different shape, to accommodate the driven gear wheel 100 (which is a worm wheel) and to accommodate a shorter input drive shaft 44a. On the shaft 102 there is provided a force-transmitting sleeve 104 which connects with the torque-transmitting device or sleeve 86a, 87a and constitutes an upward extension thereof, said sleeves 104 and 87a being rigidly connected with a shoulder 106 which turnably carries the inner cam 60. The upper rotary drive member 30a has worm teeth 108 engaged with the worm wheel 100, said member 30a being carried on the sleeve extension 104 and being rigidly affixed thereto. The lower drive member 32a is turnably carried on the sleeve extension 104 and has spur gear teeth 110 engaged with the gear 84, and also has worm teeth or a thread 112 engaged with the worm wheel 100. The drive member 32a is turnably connected with the outer cam 62.

The action of the transmission of FIG. 7 is very similar to that already described above. The drive elements (worm elements) 30a and 32a are individually and axially movable, and when they are driven upward by the associated cams 60, 62 they will impart a clockwise driving movement to the output worm wheel 100. When the members 30a, 32a are, at alternate intervals, not driving the worm wheel 100 but instead are devoid of load, they are intermittently alternately rotated by the segmental drive gears 84, 96 so as to follow the associated cams downward and effect a return of the drive members for the next work-performing movement.

It can now be readily understood from the foregoing that input power is applied to turn the input shaft 44, or 44a. Output is linear, from the screw 20 being raised, or from the worm wheel 100 being turned clockwise.

The rotary compound cam device 34 is continuously turned by the power applied to the input shaft, this alternately raising and lowering the sets of rollers 56, 58, and the cams 60, 62. During the raising movement of the cam 60 its associated nut or drive member 32 (or 32a) is raised axially, driving the output member 20 (or 100). While this is occurring the other cam 62 is lowering, and the intermittent drive 96 is rotating the other drive member 30 (or 30a) to shift it axially downward in readiness for its working movement, which is initiated by the reversing of the movements of the cams 60, 62. Then the drive member 30 (or 30a) does the work or lifting, and the drive member 32 (or 32a) has the retrograde downward movement, effected by the intermittent drive 84. Powerful forces may be involved, and a small amount of friction.

It will now be understood from the foregoing that I have provided an improved transmission of the kind set forth in my identified patents, which is much more compact and is much smaller than the patented devices. The present transmission utilizes fewer parts, is simpler and less costly to manufacture. Moreover, it is more rugged, durable and powerful, and is characterized by a more direct action of the heavy load carrying members and by shorter sections of said members. For example, it will be understood that the load from the members 30, 32 is transmitted through the rollers 56, 58 to the rotary cam device 34 and thence to the roller assemblage 50, 52, 54 directly to the bottom wall 48 of the casing 28. The forces are thus concentrated closely about the driven shaft or screw 20. This makes possible lighter and smaller sections of the operating parts.

Variations and modifications may be made within the scope of the claims, and portions of the improvement may be used without others.

I claim:

1. A mechanical transmission comprising, in combination:
   (a) a toothed driven member,
   (b) a pair of juxtaposed, threaded rotary drive members disposed end-to-end, which members are individually turnable and axially movable, and are both engaged with the teeth of the driven member to provide for actuation of the latter in response to axial movements of the drive members, said threaded members being adapted in response to their turning to experience reverse, return axial movements without requiring retrograde movement of the driven member,
   (c) a rotary cam device held against axial movement,
   (d) means for intermittently alternately turning the drive members simultaneously with continuous turning of the rotary cam device, said means including a torque-transmitting device connected to one rotary cam and extending axially through said cam device,
   (e) a pair of juxtaposed concentrically-disposed rotary cams having faces disposed opposite said rotary cam device and mounted for solely axial movement,
   (f) roller elements between and engaged with the cams and cam device,
   (g) a driven cage engaged with the roller elements,
   (h) means effecting independent axial drives between said cams and said drive members,
   (i) said cams and cam device having opposed wavy surfaces of complementary contour, formed by receding and advancing portions thereof.

2. A mechanical transmission as in claim 1, wherein:
   (a) said rotary cam device extends and rotates around said driven member.

3. A mechanical transmission as in claim 1, wherein:
   (a) said rotary cam device comprises flat, annular cam tracks disposed substantially in a plane normal to the axis of the rotary drive members.

4. A mechanical transmission as in claim 1, wherein:
   (a) said drive members having annular abutment surfaces engaged with the rotary cams for effecting said axial drives.

5. A mechanical transmission as in claim 1, wherein:
   (a) said torque-transmitting device comprises a sleeve coaxial with said rotary cams.

6. A mechanical transmission as in claim 5, wherein:
   (a) said torque-transmitting device comprises an extensible and retractable sleeve coaxial with said rotary cams,
   (b) said sleeve comprising separate parts having splined connections with each other.

7. A mechanical transmission as in claim 1, wherein:
   (a) anti-friction bearing means and an annular support therefor, for rotatably carrying said cam device and supporting the same against axial movement,
   (b) said means for intermittently turning one drive member comprising a gear shaft passing outward through and bearing in said bearing support.

8. A mechanical transmission as in claim 7, wherein:
   (a) said torque-transmitting device comprising a sleeve,
   (b) the means for intermittently turning said one drive member comprising a gear on said sleeve and a cooperable gear on said gear shaft.

9. A mechanical transmission as in claim 8, wherein:
   (a) said sleeve rotates around said driven member.

10. A mechanical transmission as in claim 8, wherein:
    (a) the means for effecting axial drive between said one drive member and cam comprises a connector sleeve extending therebetween,
    (b) said other drive member being turnable about said connector sleeve.

11. A mechanical transmission as in claim 1, wherein:
    (a) said driven member comprises a worm gear,
    (b) said drive members comprising worms.

12. A mechanical transmission as in claim 1, wherein:
    (a) said driven member comprises a threaded bar,
    (b) said drive members comprising nuts threaded on said bar.

13. A mechanical transmission as in claim 1, wherein:
    (a) said cam device comprises two concentrically-disposed axial-face cams constituted as a single annular piece.

14. A mechanical transmission as in claim 1, wherein:
    (a) said means for intermittently turning the drive members comprises a shaft having driving engagement with said cam device and also with said cage.

15. A mechanical transmission as in claim 1, wherein:
    (a) one of said drive members comprises a hollow nut,
    (b) said other drive member comprising a nut nested in said hollow nut.

16. A mechanical transmission as in claim 1, wherein:
    (a) said rotary cams are keyed to each other to permit relative axial movement and to prevent relative turning.

17. A mechanical transmission as in claim 16, wherein:
    (a) said driven member is restrained from turning,
    (b) one of said rotary cams being keyed to said driven member to prevent turning of the cams.

References Cited

UNITED STATES PATENTS

| 2,836,985 | 6/1958 | Maroth | 74—424.8 |
| 2,928,289 | 3/1960 | Maroth | 74—424.8 |
| 3,266,333 | 8/1966 | Maroth | 74—424.8 |

DONLEY J. STOCKING, *Primary Examiner.*

LEONARD H. GERIN, *Examiner.*